US011958546B2

(12) United States Patent
Jeong et al.

(10) Patent No.: US 11,958,546 B2
(45) Date of Patent: Apr. 16, 2024

(54) STEERING CONTROL DEVICE AND STEERING ASSIST SYSTEM INCLUDING SAME

(71) Applicant: HL MANDO CORPORATION, Gyeonggi-do (KR)

(72) Inventors: Min Woo Jeong, Gyeonggi-do (KR); Sun Hong Park, Gyeonggi-do (KR); Hyun Chul Tae, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 309 days.

(21) Appl. No.: 17/618,893

(22) PCT Filed: Jun. 11, 2020

(86) PCT No.: PCT/KR2020/007545
§ 371 (c)(1),
(2) Date: Dec. 14, 2021

(87) PCT Pub. No.: WO2020/256338
PCT Pub. Date: Dec. 24, 2020

(65) Prior Publication Data
US 2022/0250675 A1 Aug. 11, 2022

(30) Foreign Application Priority Data

Jun. 20, 2019 (KR) .................. 10-2019-0073259

(51) Int. Cl.
*B62D 5/04* (2006.01)
*B60W 10/20* (2006.01)
(Continued)

(52) U.S. Cl.
CPC ...... *B62D 5/0484* (2013.01); *H04L 12/40013* (2013.01); *H04L 12/40189* (2013.01); *H04L 2012/40273* (2013.01)

(58) Field of Classification Search
CPC ..... H04L 2012/40273; H04L 12/40189; H04L 12/40013; B62D 5/0484; B60W 50/029; B60W 10/20
See application file for complete search history.

(56) References Cited

U.S. PATENT DOCUMENTS 7,289,889 B2 * 10/2007 Naik .................. B60W 50/023
  701/1
10,229,547 B2 * 3/2019 Isozaki ................ H04L 9/0891
(Continued)

FOREIGN PATENT DOCUMENTS

DE       100 39 459        2/2002
DE    10 2019 212 574      2/2020
(Continued)

OTHER PUBLICATIONS

Office Action dated Jun. 23, 2023 for German Patent Application No. 11 2020 002 938.7 and its English translation by Google Translate.
(Continued)

*Primary Examiner* — Rasheed Gidado
(74) *Attorney, Agent, or Firm* — Ladas & Parry, LLP

(57) ABSTRACT

The present disclosure relates to a steering control device and a steering assist system including same. Particularly, a steering control device according to the present disclosure comprises an input-side steering control device which includes: a first controller connected to an output-side steering control device via at least one first communication bus; and a second controller connected to the output-side steering control device via at least one second communication bus and connected to the first controller via at least one third communication bus.

20 Claims, 19 Drawing Sheets

(51) Int. Cl.
    *B60W 50/029*     (2012.01)
    *H04L 12/40*     (2006.01)

(56) References Cited

U.S. PATENT DOCUMENTS

| | | | |
|---|---|---|---|
| 10,464,599 B2* | 11/2019 | Dreyer | B62D 15/021 |
| 11,332,140 B2* | 5/2022 | Yamashita | B60W 10/20 |
| 2003/0120401 A1 | 6/2003 | Bauer et al. | |
| 2006/0015231 A1 | 1/2006 | Yoshimura et al. | |
| 2018/0257703 A1 | 9/2018 | Dreyer | |
| 2020/0062299 A1 | 2/2020 | Jeong et al. | |
| 2022/0332362 A1 | 10/2022 | Watanab et al. | |

FOREIGN PATENT DOCUMENTS

| | | |
|---|---|---|
| DE | 11 2020 005 378 | 8/2022 |
| JP | 2004-338563 | 12/2004 |
| JP | 2015-081013 | 4/2015 |
| JP | 2015-199398 | 11/2015 |

OTHER PUBLICATIONS

International Preliminary Report on Patentability (Chapter I) for PCT/KR2020/007545 dated Dec. 21, 2021 and its English translation from WIPO (now published as WO 2020/256338).

International Search Report for PCT/KR2020/007545 dated Sep. 11, 2020 (now published as WO 2020/256338) with English translation provided by WIPO.

Written Opinion of the International Searching Authority for PCT/KR2020/007545 dated Sep. 11, 2020 (now published as WO 2020/256338) with English translation provided by Google Translate.

* cited by examiner

STEERING CONTROL DEVICE AND STEERING ASSIST SYSTEM INCLUDING SAME

TECHNICAL FILED

The present disclosure relates to a steering control device and a steering assistance system including the same.

BACKGROUND ART

A steering assistance system of a vehicle is a system that assists in changing the driving direction of a vehicle according to the driver's intention, and a system that assists the driver to operate the vehicle more easily by generating steering assistance in the desired driving direction.

This steering assistance system is implemented with a hydraulic power assistance steering system (HPS) and an electronic power assistance steering system (EPS).

In the recent steering assistance system, in case a specific configuration included in the system fails, a redundant system having the same configuration as the specific configuration is applied. In addition, a fail safety function is implemented based on such a redundant system, and there is being developed a technology for more stably implementing fail safety.

DETAILED DESCRIPTION OF INVENTION

Technical Problem

In this background, an object of the present disclosure is to provide a steering control device capable of performing stable control without temporary performance degradation by continuously controlling an output-side steering control device through another communication path even if a communication bus fails, and a steering assistance system including the same.

In addition, an object of the present disclosure is to provide a steering control device and a steering assistance system including the same capable of minimizing the difference in driving feeling by a driver by continuously providing steering assistance power without an interruption of control even if a communication bus fails.

Further, an object of the present disclosure is to provide a steering control device and a steering assistance system including the same capable of lightening the vehicle and reducing the manufacturing cost by efficiently deploying the communication bus and achieving a high degree of integration.

Technical Solution

In order to solve the above problems, in one aspect, the present disclosure provides a steering control device for controlling an output-side actuator mechanically separated from an input-side actuator including a first controller connected to an output-side steering control device through at least one first communication bus, and an input-side steering control device comprising a second controller connected to the output-side steering control device through at least one second communication bus and connected to the first controller through at least one third communication bus, wherein at least one of the first controller and the second controller determines whether at least one communication bus connected to the output-side steering control device fails, outputs a control signal to the output-side steering control device through a communication bus in a normal state based on a determination result, and outputs, if the at least one first communication bus fails, the control signal to the output-side steering control device through a communication path according to the third communication bus and the second communication bus.

In another aspect, the present disclosure provides a steering control device for controlling an output-side actuator mechanically separated from an input-side actuator including a first controller connected to an output-side steering control device and a second controller through a first communication bus, and an input-side steering control device comprising the second controller connected to the output-side steering control device and the first controller through a second communication bus, wherein at least one of the first controller and the second controller determines whether any one of the first communication bus and the second communication bus fails, and outputs a control signal to the output-side steering control device through a communication bus in a normal state based on a determination result.

In another aspect, the present disclosure provides
a steering assistance system including an input-side steering control device for controlling an input-side actuator, an output-side steering control device for controlling an output-side actuator, and at least one public communication bus for connecting the input-side actuator, the output-side actuator, the input-side steering control device and the output-side steering control device, wherein the input-side steering control device includes a first controller connected to the output-side steering control device through the public communication bus and connected to a second controller through a first communication bus, and a second controller connected to the first controller through the first communication bus and connected to the output-side steering control device through the public communication bus.

Advantageous Effects

According to an embodiment of the present disclosure, it is possible to provide a steering control device and a steering assistance system capable of performing stable control without temporary performance degradation by continuously controlling an output-side steering control device through another communication path even if a communication bus fails.

In addition, according to an embodiment of the present disclosure, it is possible to provide a steering control device and a steering assistance system capable of minimizing the difference in driving feeling by a driver by continuously providing steering assistance power without an interruption of control even if a communication bus fails.

In addition, according to an embodiment of the present disclosure, it is possible to provide a steering control device and a steering assistance system capable of lightening the vehicle and reducing the manufacturing cost by efficiently deploying the communication bus and achieving a high degree of integration.

MODE FOR DISCLOSURE

Hereinafter, it will be described embodiments of the present disclosure in detail with reference to exemplary drawings. Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements. When it is mentioned that an element "is connected to", "is coupled to", or "contacts" the other element, it should be interpreted that, not only can the element is directly connected to, directly coupled to, or directly contact the other element, but another element can also be interposed between the element and the other element.

Figure 1:
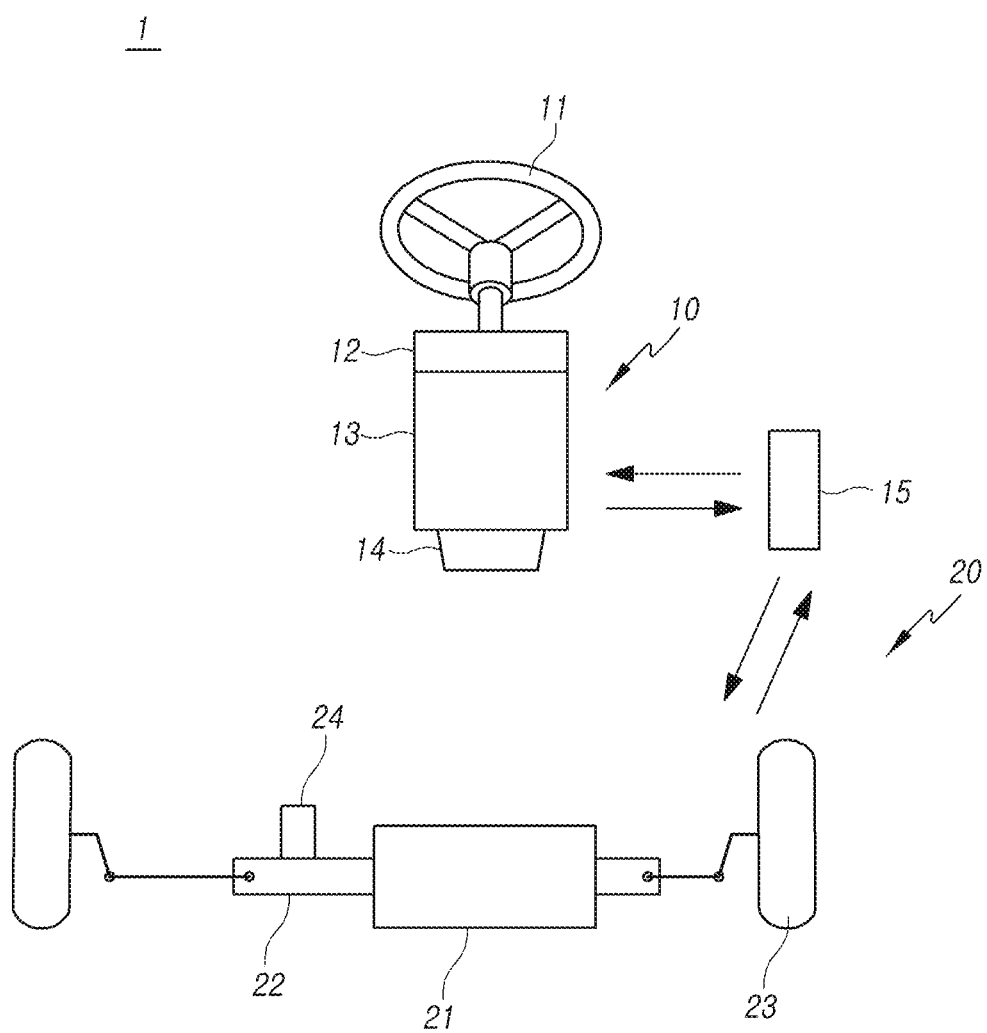
FIG. 1 is a diagram schematically illustrating a steering assistance system according to the present disclosure.

FIG. 1 is a diagram schematically illustrating a steering assistance system 1 according to the present disclosure.

Referring to FIG. 1, a steering assistance system 1 according to the present disclosure refers to a system for assisting the steering force so that the driver can easily steer.

The steering assistance system 1 may include a hydraulic power steering (HPS) system that generates hydraulic pressure by actuating a pump to provide steering assistance power, and an electric power steering (EPS) system that drives a motor to provide steering assistance power, etc. Hereinafter, the present disclosure will be described with reference to the electric steering assistance system 1 for convenience, but the present disclosure is not limited thereto.

Meanwhile, a steering assistance system 1 may be classified into a mechanical steering assistance system, a steer-by-wire (SbW) system, and the like, depending on whether an input-side actuator 10 and an output-side actuator 20 are coupled by a mechanical connection member.

The mechanical steering assistance system 1 may refer to a steering assistance system 1 in which the input-side actuator 10 and the output-side actuator are mechanically connected through a mechanical connection member. According to this mechanical steering assistance system 1, the rotational force (torque) generated by rotating the steering wheel 11 by a driver is transferred to the output-side actuator 20 through a mechanical power transmission device or a mechanical connection member (e.g., linkage, steering shaft, universal joint, etc.), so that the wheel 23 can be steered.

Meanwhile, the SbW system may refer to the steering assistance system 1 in which the input-side actuator 10 and the output-side actuator 20 are electrically connected through a wire, a cable, or the like instead of a mechanical power transmission device. That is, the SbW system may mean that the input-side actuator 10 and the output-side actuator 20 are mechanically separated. According to the SbW system, the input-side actuator 10 detects the steering angle of the steering wheel, the steering control device 15 calculates a steering control value (e.g., a target rack stroke value) for the steering angle, and outputs an electrical signal indicating a steering control value to the output-side actuator 20 to drive and the output-side actuator 20.

The steering assistance system 1 in the present disclosure is described as an SbW system for convenience, but is not limited thereto.

The steering assistance system 1 according to the present disclosure may include an input-side actuator 10, a steering control device 15, and an output-side actuator 20, and the like. Although not shown, in the case that the steering assistance system 1 is an SbW system, the input-side actuator 10 and the output-side actuator 20 may be connected to each other by an electrical connection member such as a wire or a cable.

The input-side actuator 10 may mean a steering input device that receives steering information (e.g., a steering angle of a steering wheel) input by the driver, generates a detection signal corresponding thereto, and outputs the detection signal to the output-side actuator 20. The input-side actuator 10 may include a steering wheel 11, a steering angle sensor 12, a reaction force motor 13 and a driver torque sensor 14.

The steering angle sensor 12 may detect a steering angle generated by the rotation of the steering wheel 11. Specifically, when the driver holds and rotates the steering wheel 11, the steering angle sensor 12 may detect the rotation angle (steering angle) of the steering wheel 11, and output a detection signal indicating the detected steering angle to the steering control device 15.

The reaction force motor 13 may receive a current command from the steering control device 15 to apply a reaction force to the steering wheel 11. Specifically, the reaction force motor 13 may receive a current command current the steering control device 15, and may output a reaction torque by being driven at a rotation speed indicated by the current command.

The driver torque sensor 14 may detect the driver torque generated by the rotation of the steering wheel 11. Specifically, when the driver holds and rotates the steering wheel 11, the driver torque sensor 14 may detect the driver torque of the steering wheel 11 and output a detection signal indicating the detected driver torque to the steering control device 15. Here, the driver torque may mean a torque generated by the driver's manipulation of the steering wheel 11.

The steering control device 15 may refer to a device for controlling steering. Specifically, the steering control device 15 receives a detection signal indicating a steering angle and a driver torque from the steering angle sensor 12 and the driver torque sensor 14, calculates a steering control value, and outputs a control signal indicating the steering control value to the output-side actuator 20.

Here, the steering control value may mean, for example, a target rack stroke value, a target rack position value, or the like, however, is not limited thereto.

Meanwhile, the steering control device 15 may receive the power information actually output from the output-side actuator 20, calculate a reaction force control value, and output a control signal indicating the reaction force control value to the input-side actuator 10, so as to provide a steering feeling to the driver.

The steering control device 15 may be implemented as an electronic control device such as an electronic controller unit (ECU), a microcomputer, or the like. In addition, as shown in FIG. 1, the steering control device 15 may be included in the input-side actuator 10 or may be separated as a separate device and disposed in a vehicle (not shown).

It will be described later a detailed description of the steering control device 15.

The output-side actuator 20 may refer to a steering output device that drives the actual vehicle to steer according to the driver's intention. The output-side actuator 20 may include a steering motor 21, a rack 22, a rack position sensor 24, a wheel 23, a vehicle speed sensor 35, and the like.

The steering motor 21 may move the rack 22 in the axial direction. Specifically, the steering motor 21 may be driven by receiving a control signal indicating a steering control value from the steering control device 15, and may linearly move the rack 22 in the axial direction.

The rack 22 may perform a linear motion by driving the steering motor 21, and the wheel 23 may be steered left or right through the linear motion of the rack 22.

The rack position sensor 24 may detect the position of the rack 22. Specifically, when the rack 22 performs a linear motion and moves from a corresponding position when the steering wheel 11 is in the neutral position, the rack position sensor 24 may detect the actual position of the rack 22 and output a detection signal indicating the position detection value of the rack 22 to the steering control device 15.

Here, the rack position sensor 24 may detect the actual moving speed of the rack 22. That is, the rack position sensor 24 may detect the position of the rack 22, calculate the moving speed of the rack 22 by differentiating the detected position of the rack 22 with respect to time, and output a detection signal indicating the moving speed value of the rack 22 to the steering control device 15. Accordingly, the rack position sensor 24 may further include a differentiator (not shown).

Although not shown, the steering assistance system 1 according to the present disclosure may further include a steering column, a pinion gear, a vehicle speed sensor for detecting the traveling speed of the vehicle, a steering angle sensor for detecting the steering angle of the wheel 23, and a yaw rate sensor for detecting the heading angle of the vehicle, and a clutch for separating or connecting a steering input part and a steering output part.

Figure 2:
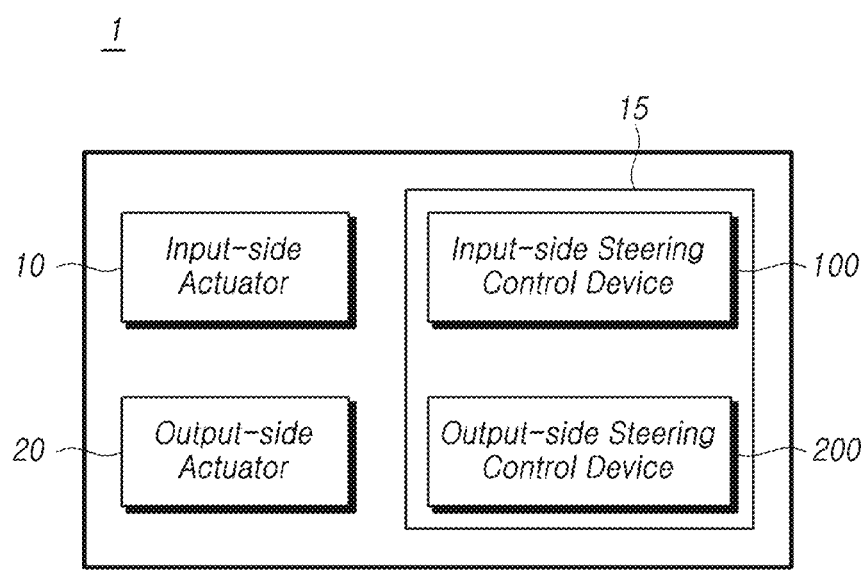
FIG. 2 is a block diagram illustrating a steering assistance system according to the present disclosure.

FIG. 2 is a block diagram illustrating a steering assistance system 1 according to the present disclosure.

Referring to FIG. 2, the steering assistance system 1 may include an input-side actuator 10, a steering control device 15, and an output-side actuator 20. In addition, the steering control device 10 may include an input-side steering control device 100 and an output-side steering control device 200.

The input-side steering control device 100 may control the input-side actuator 10, and the output-side steering control device 200 may control the output-side actuator 20. In addition, the input-side steering control device 100 and the output-side steering control device 200 may transmit/receive data using a public communication bus 400 or a plurality of communication buses to be described later in order to implement the functions of the steering control device 15 described above.

For example, the input-side steering control device 100 may receive a detection signal indicating a steering angle and driver torque, calculate a steering control value, and output a control signal indicating the steering control value to the output-side steering control device 200, and the output-side steering control device 200 may output a control signal to the output-side steering control device 200. Here, the output-side steering control device 200 may receive a control signal and verify the validity of the control signal.

Hereinafter, it will be described a signal transmission/reception relationship between the input-side steering control device 100 and the output-side steering control device 200.

Figure 3:
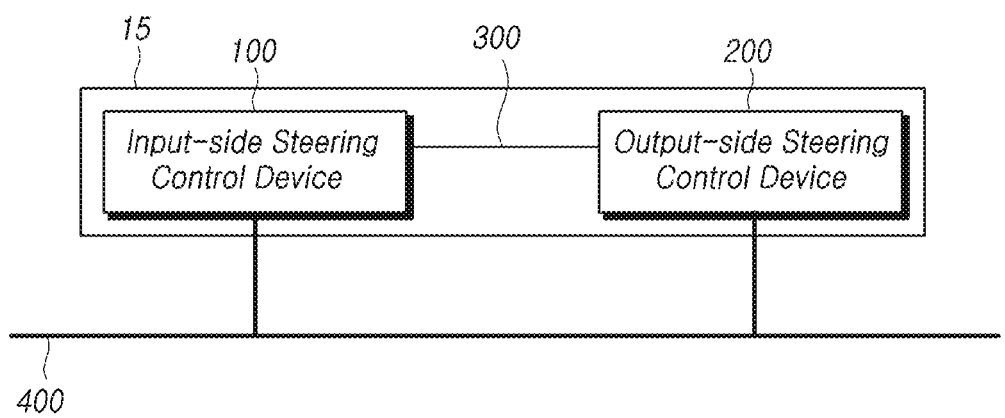
FIG. 3 is a block diagram illustrating a steering control device and a public communication bus according to the present disclosure.

FIG. 3 is a block diagram illustrating an input-side steering control device 100, an output-side steering control device 200 and a public communication bus according to the present disclosure.

Referring to FIG. 3, the input-side steering control device 100 and the output-side steering control device 200 according to the present disclosure may be directly connected through the communication bus 300 to transmit and receive data, signals, etc., or may be connected through a public communication bus 400 to exchange data or signals with components included in the steering assistance system 1.

The public communication bus 400 may mean vehicle communication means such as the input-side actuator 10 and the output-side steering control device 200 shown in FIG. 1, and each component included in the steering assistance system 1 may exchange data, signals, and the like with each other through the public communication bus 400.

This public communication bus 400 may include a bus for transmitting and receiving a first state of a signal, for example a high state of a signal, and a bus for transmitting and receiving a second state, for example a low state of a signal, however, is not limited thereto.

Meanwhile, the public communication bus 400 may be included in a cable, a wire, etc., and may be a bus used in communication means such as a controller area network (CAN), Ethernet, and Flexray, however, is not limited thereto.

In addition, the input-side steering control device 100 may determine whether a communication bus 300 fails. For example, if the input-side steering control device 100 transmits a test signal to the output-side steering control device 200 through the communication bus 300 and receive a feedback signal from the output-side steering control device 200 through the communication bus 300, it is determined that the communication bus 300 is in a normal state, and if the feedback signal is not received, it is determined that the communication bus 300 fails, however, is not limited thereto.

Hereinafter, the steering control device 15 according to the present disclosure will be described in detail.

Figure 4:
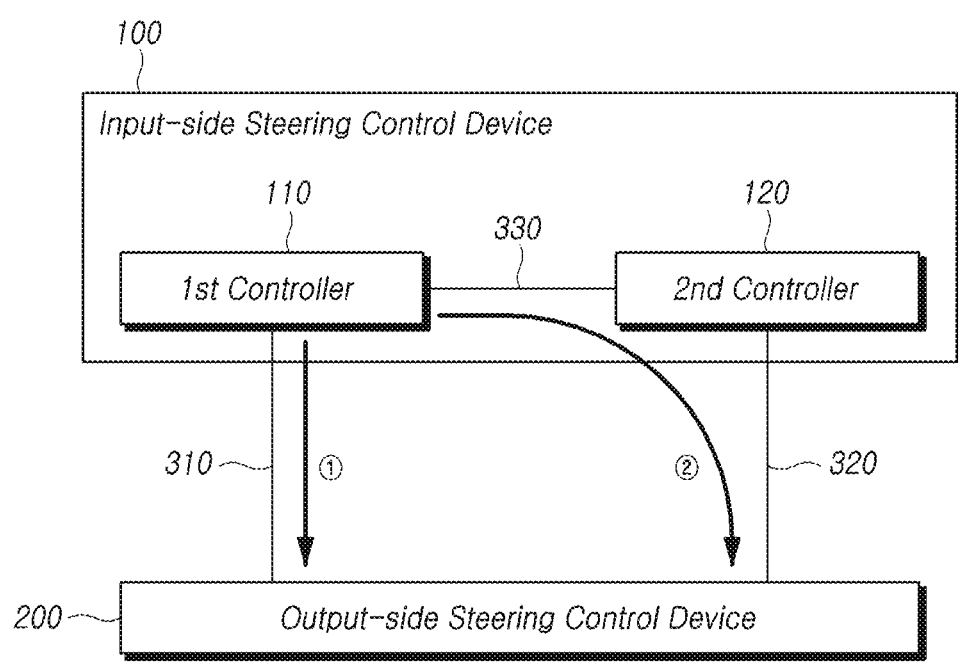
FIG. 4 is a block diagram illustrating a first embodiment of a steering control device according to the present disclosure.

FIG. 4 is a block diagram illustrating a first embodiment of a steering control device 100 according to the present disclosure.

Referring to FIG. 4, the steering control device 15 according to the present disclosure may refer to the steering control device 15 described above with reference to FIGS. 1 to 3. The steering control device 15 may be implemented as a redundant system including a plurality of controllers. For example, the input-side steering control device 100 may include a first controller 110, a second controller 120, and the like. However, the present disclosure is not limited thereto, and the steering control device 15 according to the present disclosure may include three or more controllers.

Here, the first controller 110 and the second controller 120 may receive information on the steering angle and the driver torque from the steering angle sensor and the driver torque sensor to calculate a steering control value, and output a control signal to the output-side steering control device 200 so as control the steering motor included in the output-side actuator 20.

For example, the first controller 110 receives steering information of the steering wheel, calculates a steering control value, and generates a control signal indicative of the steering control value.

Each of the first controller 110 and the second controller 120 may be connected to the output-side steering control device 200 through at least one communication bus, and may transmit a control signal to the output-side steering control device 200 through the communication bus.

For example, the first controller 110 is connected to the output-side steering control device 200 through at least one first communication bus 310.

As another example, the second controller 120 is connected to the output-side steering control device 200 through at least one second communication bus 320.

Meanwhile, the first controller 110 and the second controller 120 may be connected through at least one communication bus to perform internal communication.

As an example, the first controller 110 and the second controller 120 are connected through at least one third communication bus 330.

Here, the communication bus may mean a communication path for transmitting and receiving data, signals, and the like. There may be one or more communication buses, a plurality of communication buses may be used for communication with the same priority, and a priority of each of the plurality of communication buses may be different from each other. A detailed description thereof will be provided later.

Such a communication bus may refer to a bus used in communication means such as a controller area network (CAN), Ethernet, and Flexray in the same way as the above-described public communication bus, however, is not limited thereto.

Meanwhile, the first controller 110 and the second controller 120 may determine whether at least one communication bus connected to the output-side steering control device 200 fails as described above with reference to FIG. 3.

For example, the first controller 110 transmits a test signal to the output-side steering control device 200 through the first communication bus 310, and determines whether the first communication bus 310 fails based on whether the feedback signal is received through the first communication bus 310. In this case, if the first controller 110 receives the feedback signal, the first controller determines that the first communication bus 310 is in a normal state, and if the first controller 110 does not receive the feedback signal, the first controller determines that the first communication bus 310 fails.

As another example, the second controller 120 transmits a test signal to the output-side steering control device 200 through the second communication bus 320, and determines whether the second communication bus 320 fails based on whether the feedback signal is received through the second communication bus 320.

Meanwhile, the first controller 110 and the second controller 120 may output a control signal to the output-side steering control device 200 through a communication bus in a normal state based on a result of the determination of whether of failure.

For example, if the first communication bus 310 is in a normal state, the first controller 110 may output a control signal to the output-side steering control device 200 through the communication path ① according to the first communication bus 310.

As another example, if the first communication bus 310 is in a normal state, the first controller 110 may output a control signal to the output-side steering control device 200 through a communication path ② according to the third communication bus 330 and the second communication bus 320.

The above-described examples may be similarly applied to the case of the second controller 120. That is, if the second communication bus 320 is in a normal state, the second controller 120 may output a control signal through the second communication bus 320, or may output a control signal through the third communication bus 330 and the first communication bus 320.

Meanwhile, one of the first controller 110 and the second controller 120 may operate as a main controller, and the other may operate as a sub (or slave) controller. In this case, the main controller has a control right to the output-side steering control device 200 and outputs a control signal to the output-side steering control device 200, and if the main controller operates, the sub-controller does not operate.

For example, in the case that the first controller 110 is the main controller and the second controller 120 is the sub-controller, the first controller 110 generates a control signal and outputs to the output-side steering control device 200. While the first controller 110 operates, the second controller 120 does not operate, however, is not limited thereto.

Alternatively, both the first controller 110 and the second controller 120 may operate as a main (or also referred to as a master) controller. In this case, the first controller 110 and the second controller 120 may each calculate a steering control value, but may output a signal divided from a control signal corresponding to the steering control value, respectively. Here, each of the divided signals may be integrated as a control signal and output to the output-side steering control device 200 to be applied to a steering motor included in the output-side actuator 20.

Meanwhile, the steering control device 100 according to the present disclosure may perform fail safe function based on a redundant system. For example, the first controller 110 and the second controller 120 may transmit information about own state through the third communication bus 330 to monitor the state of the other party, and a controller in the normal state may take over the function of the controller in the abnormal state. It will be described a detailed description thereof later in detail with reference to FIG. 9.

Hereinafter, it will be described an embodiment of outputting a control signal by changing a communication path depending on whether the communication bus fails.

Figure 5:
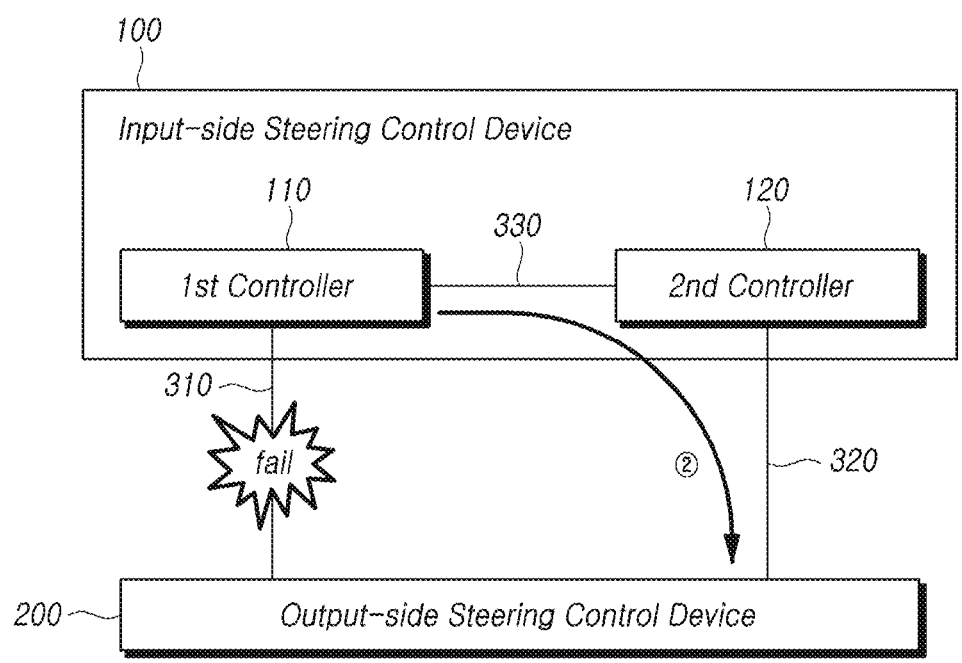
FIG. 5 is a block diagram illustrating a first embodiment in which the input-side steering control device according to the first embodiment outputs a control signal.

FIG. 5 is a block diagram illustrating a first embodiment in which the input-side steering control device 100 according to the first embodiment outputs a control signal.

Referring to FIG. 5, in the case that a specific controller included in the input-side steering control device 100 and the output-side steering control device 200 are connected through one communication bus, if the one communication bus fails, the specific controller may output a control signal to the output-side steering control device 200 through a communication path by another communication bus in a normal state.

As an example, in the case that there is one first communication bus 310 and the first communication bus 310 fails, the first controller 110 110 outputs a control signal to the output-side steering control device 200 through the communication path ② according to the third communication bus 330 and the second communication bus 320.

Although not shown, the above-described example may be similarly applied to the second controller 120. That is, if one second communication bus 320 fails, the second controller 120 may output a control signal through a communication path according to the third communication bus 330 and the first communication bus 310.

Meanwhile, as described above, the first communication bus 310 and the second communication bus 320 may be plural. Hereinafter, it will be described in detail an embodiment in which a control signal is output by changing a communication path according to whether a plurality of communication buses fail or not.

Figure 6:
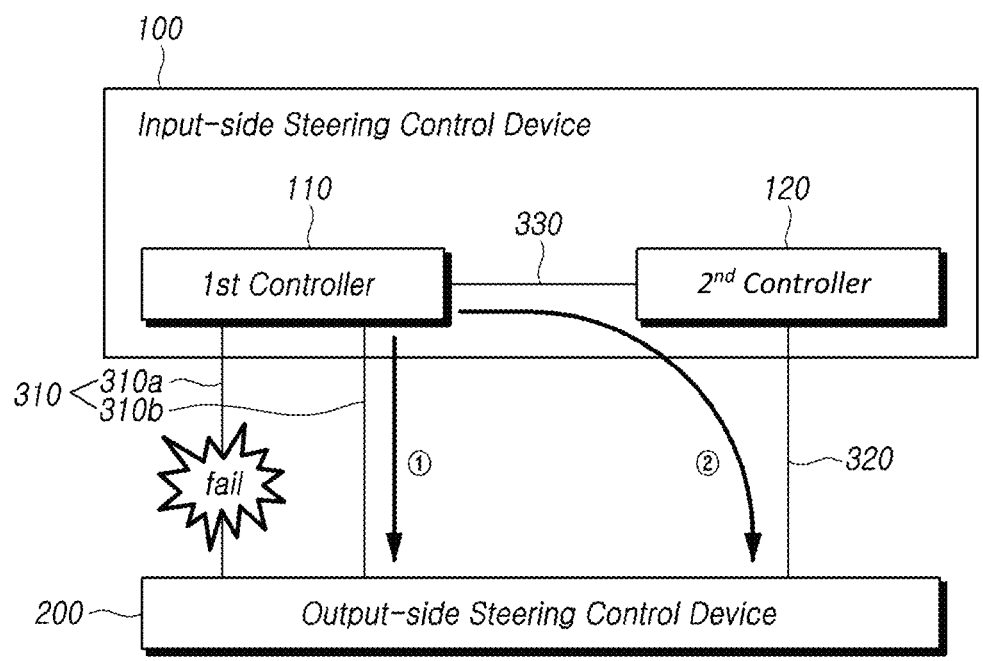
FIG. 6 is a block diagram illustrating a second embodiment in which the input-side steering control device according to the first embodiment outputs a control signal.

FIG. 6 is a block diagram illustrating a second embodiment in which the input-side steering control device 100 according to the first embodiment outputs a control signal.

Referring to FIG. 6, in the case that a specific controller included in the steering control device 100 according to the present disclosure and the output-side steering control device 200 are connected through a plurality of communication buses, the specific controller may output a control signal to the output-side steering control device 200 through any one of two or more communication paths formed based on a communication bus in a normal state.

For example, if a failing first communication bus 310 exists among the plurality of first communication buses 310, the first controller 110 outputs a control signal to the output-side steering control device 200 through a first communication bus 310 in a normal state.

Specifically with reference to FIG. 6, for example, if any one of the first communication buses 310 among the two first communication buses 310 fails, the first controller 110 outputs a control signal to the output-side steering control device 200 through the communication path ① according to the other first communication bus 310 in a normal state. However, the present invention is not limited thereto.

As another example, if a failing first communication bus 310 exists among the plurality of first communication buses 310, the first controller 110 outputs a control signal to the output-side steering control device 200 through the third communication bus 330 and the second communication bus 320 in a normal state.

Specifically with reference to FIG. 5, for example, if any one of the first communication buses 310 among the two first communication buses 310 fails, the first controller 110 outputs a control signal to the output-side steering control device 200 through the communication path ② according to the third communication bus 330 and the second communication bus 320 in a normal state. However, the present invention is not limited thereto.

In this case, the processing speed and computational complexity required when the first controller 110 outputs a control signal through the communication path ① according to the first communication bus 310 may be slightly faster and simpler than the processing speed required when outputting a control signal through the communication path ② according to the third communication bus 330 and the second communication bus 320.

Although not shown, the above-described example may be similarly applied to the second controller 120. That is, if a failing second communication bus 320 exists among the plurality of second communication buses 320, the second controller 120 may output a control signal through the second communication bus 320 in a normal state, or may output a control signal through the third communication bus 330 and the first communication bus 310.

Meanwhile, a plurality of communication buses connected between the controller and the output-side steering control device 200 may all fail. Hereinafter, it will be described in detail an embodiment of outputting a control signal when all of the plurality of communication buses fail.

Figure 7:
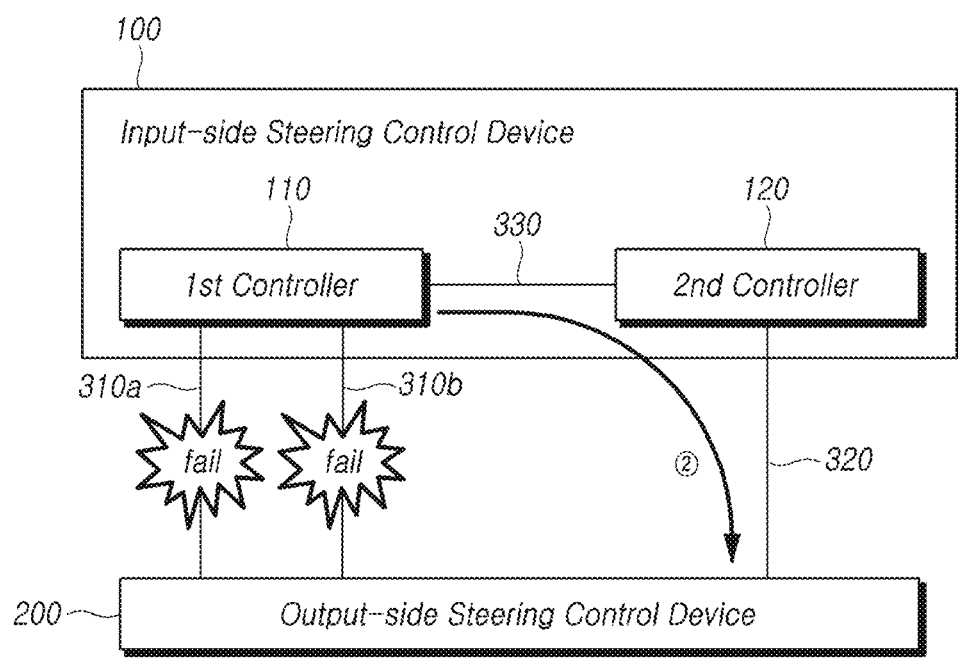
FIG. 7 is a block diagram illustrating a third embodiment in which the input-side steering control device according to the first embodiment outputs a control signal.

FIG. 7 is a block diagram illustrating a third embodiment in which the input-side steering control device 100 according to the first embodiment outputs a control signal.

Referring to FIG. 7, in the case that all of the plurality of communication buses connected between the specific controller included in the input-side steering control device 100 and the output-side steering control device 200 fail, the specific controller may output a control signal to the output steering control device 200 through a communication path through a communication bus connected between the controllers and a communication bus connected between another controller and the output steering control device 200.

For example, if all of the plurality of first communication buses 310 fail, the first controller 110 outputs a control signal to the output-side steering control device 200 through the communication path ② according to the third communication bus 330 and the second communication bus 320.

Although not shown, the above-described example may be similarly applied to the second controller 120. That is, if all of the plurality of second communication buses 320 fail, the second controller 120 may output a control signal to the output-side steering control device 200 through a communication path according to the third communication bus 330 and the first communication bus 310 in a normal state.

Meanwhile, as described above, the priority of each of the plurality of communication buses connected between the controller and the output-side steering control device 200 may be determined differently.

Figure 8:
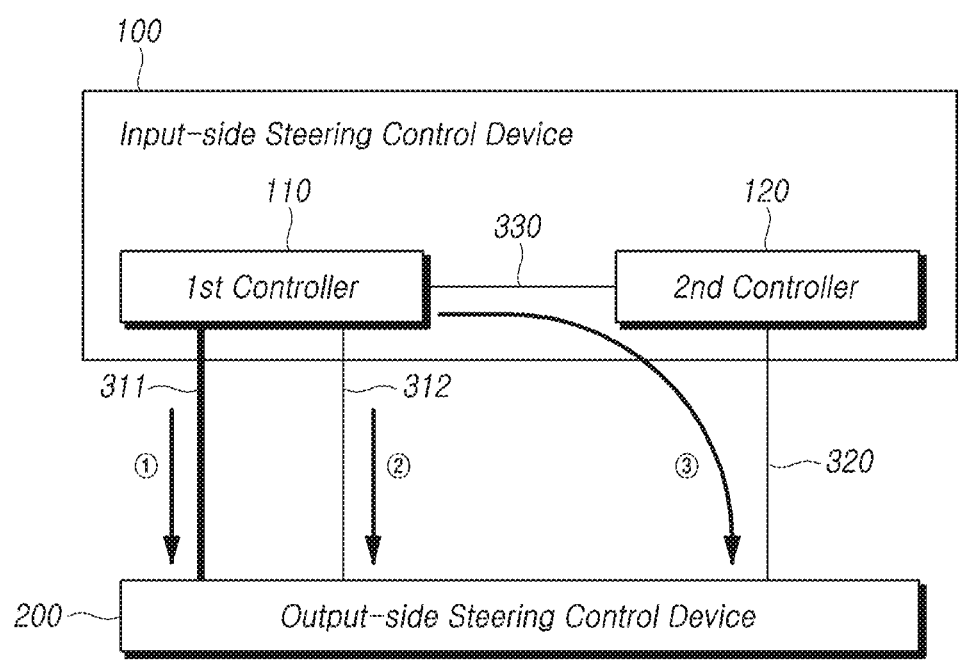
FIG. 8 is a block diagram illustrating a fourth embodiment in which the input-side steering control device according to the first embodiment outputs a control signal.

FIG. 8 is a block diagram illustrating a fourth embodiment in which the input-side steering control device 100 according to the first embodiment outputs a control signal.

Referring to FIG. 8, the plurality of communication buses connected between the specific controller and the output-side steering control device 200 may include a main communication bus and a sub communication bus. In this case, there may be more than one sub communication bus. However, the present invention is not limited thereto.

Referring to FIG. 8, for example, the first communication bus 310 is a first main communication bus 311 that is preferentially used and a first sub communication bus 312 used when the first main communication bus 311 fails.

Although not shown, the second communication bus 320 may also include a second main communication bus and one or more second sub communication buses, and the third communication bus 330 may also include a third main communication bus and one or more third sub communication buses.

Meanwhile, the specific controller may determine whether the main communication bus fails, and according to the determination result, may select any one of a communication path according to the main communication bus, a communication path according to the sub communication bus, and a communication path via the third communication bus 330 to output a control signal to the output-side steering control device 200.

For example, if the first main communication bus 311 is in a normal state, the first controller 110 outputs a control signal to the output-side steering control device 200 through the communication path ① according to the first main communication bus 311.

As another example, if the first main communication bus 311 fails, the first controller 110 outputs a control signal to the output-side steering control device 200 through the communication path ② according to the first sub communication bus 312.

Meanwhile, if both the main communication bus and the sub communication bus fail, the specific controller may output a control signal through a communication path via the third communication bus 330.

For example, if the first main communication bus 311 and the first sub communication bus 312 fail, the first controller 110 outputs a control signal to the output-side steering control device 200 through the communication path ③ according to the third communication bus 330 and the second communication bus 320.

Although not shown, the above-described example may be similarly applied to the second controller 120.

As described above, the steering control device 100 according to the present disclosure continuously controls the output-side steering control device 200 through another communication path even if the communication bus fails, thereby performing stable control without temporary performance degradation.

Meanwhile, the controller included in the steering control device 15 according to the present disclosure may monitor its own state. Hereinafter, it will be described in detail an operation of performing fail safety when the controller fails.

Figure 9:
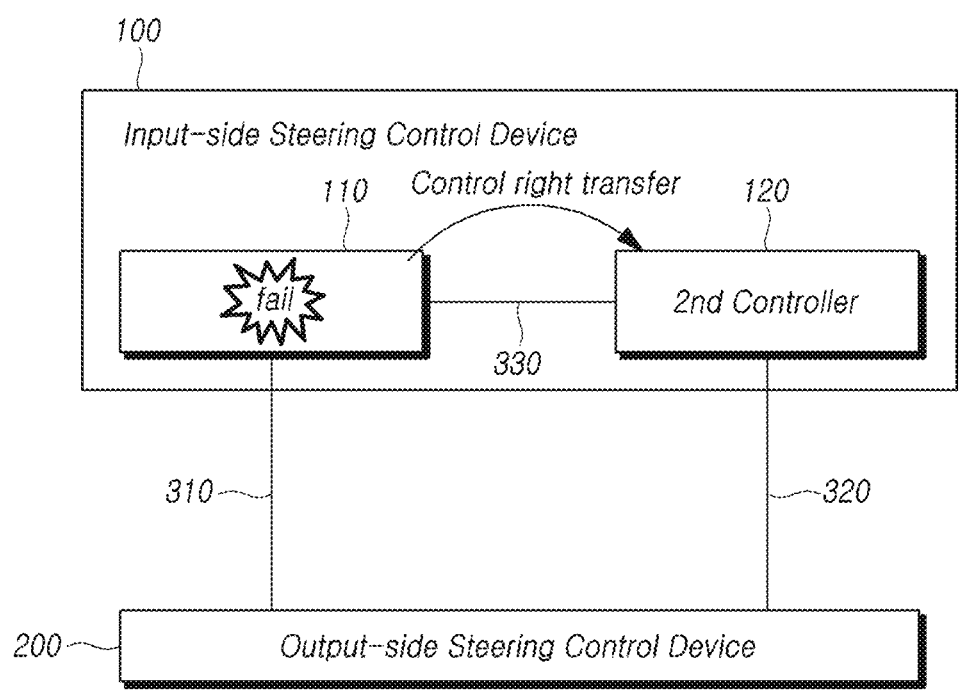
FIG. 9 is a block diagram for explaining an operation performed when the controller included in the steering control device according to the first embodiment fails.

FIG. 9 is a block diagram for explaining an operation performed when the controller included in the steering control device 15 according to the first embodiment fails.

Referring to FIG. 9, each of the plurality of controllers included in the steering control device 15 may determine whether its own state is a fail or not by monitoring whether the supply voltage supplied from the outside is interrupted or a short occurs, or comparing the control value calculated by itself with the received control value calculated by another controller and received through the third communication bus 330.

If the specific controller fails, unlike the above-described fail of the communication bus, the control signal of the specific controller in an abnormal state may be an inaccurate control signal.

In particular, if a specific controller in an abnormal state operates as the main controller, it is required to transfer the control right for the output-side steering control device 200 of the specific controller to another controller.

Referring to FIG. 9, for example, the first controller 110 operating as a main controller may determine whether the first controller 110 fails, and may transfer the control right for the output-side steering control device 200 to the second controller 120 based on the determination result. Also, the second controller 120 operating as a sub-controller performs an operation of controlling the output-side steering control device 200 when the control right is transferred.

As described above, the steering control device 15 according to the present disclosure can continuously provide steering assistance power without interruption by performing fail safety by distinguishing between a failure of a controller and a failure of a communication bus.

Figure 10:
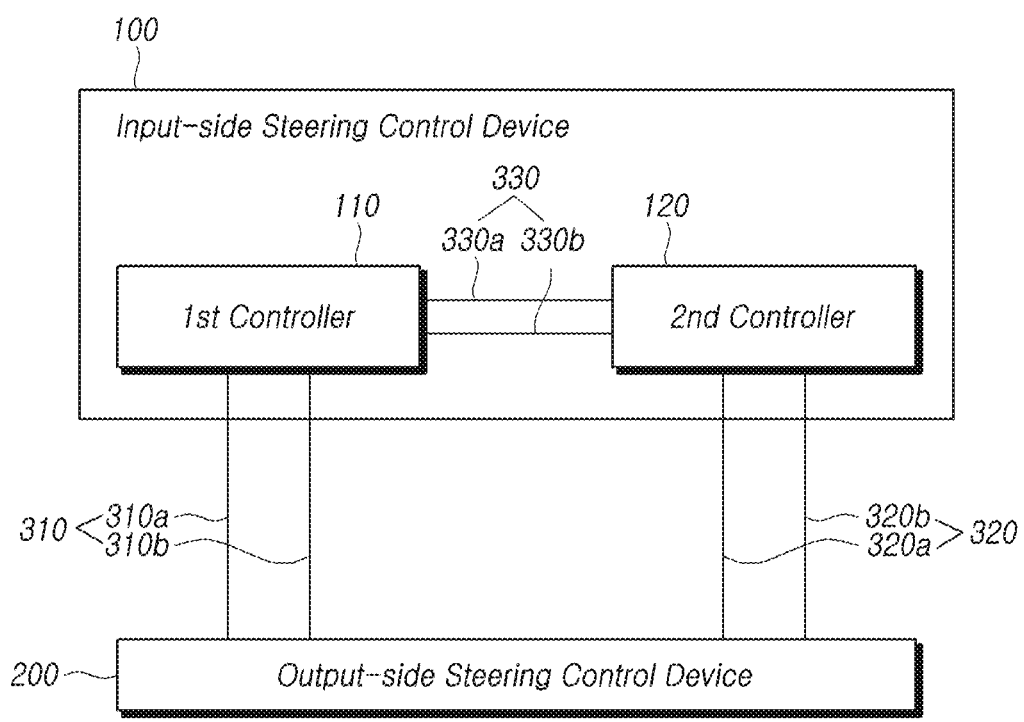
FIG. 10 is a block diagram illustrating a second embodiment of a steering control device according to the present disclosure.
Figure 11:
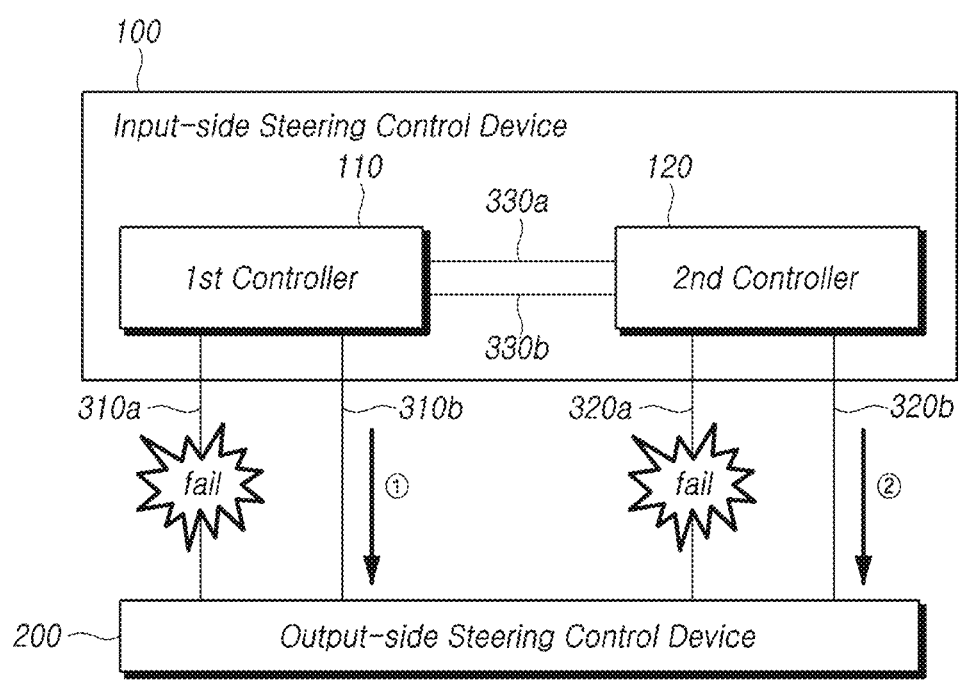
FIG. 11 is a block diagram illustrating an embodiment in which the input-side steering control device according to the second embodiment outputs a control signal.

FIG. 10 is a block diagram illustrating a second embodiment of a steering control device 15 according to the present disclosure, and FIG. 11 is a block diagram illustrating an embodiment in which the input-side steering control device 100 according to the second embodiment outputs a control signal.

Referring to FIG. 10, all of the plurality of controllers included in the steering control device 15 according to the present disclosure may operate as a main controller. In this case, the plurality of controllers may respectively calculate the steering control value, and output a signal divided from the control signal corresponding to the steering control value, respectively.

Meanwhile, each of the first communication bus 310, the second communication bus 320, and the third communication bus 330 may be configured in plurality, and each communication bus may be used for internal communication with the same priority, or may be used for internal communication with different priorities.

Here, each of the plurality of controllers may determine whether the communication bus connected to the output-side steering control device 200 fails.

Referring to FIG. 11, for example, the first controller 110 determines whether the plurality of first communication buses 310 fail, and the second controller 120 determines whether the plurality of second communication buses 320 fail.

If there is a failed communication bus, each of the plurality of controllers may output a signal divided from the control signal to the output-side steering control device 200 through another communication bus in a normal state.

Referring to FIG. 11, for example, if any one of the first communication bus 310 among the plurality of first communication buses 310 fails, the first controller 110 outputs a first signal divided from the control signal to the output-side steering control device 200 through the first communication bus 310 in a normal state. Meanwhile, if any one second communication bus 320 among the plurality of second communication buses 320 fails, the second controller 120 outputs a second signal divided from the control signal to the output-side steering control device 200 through the second communication bus 320 in a normal state. In this case, the control signal is equal to the sum of the first signal and the second signal.

Although not shown, the steering control device 15 according to the second embodiment shown in FIGS. 10 and 11 may perform the same function of the steering control device 15 according to the first embodiment.

According to the present disclosure, the steering control device 15 according to the second embodiment provides the steering assistance power continuously without interruption of control even if the communication bus fails, thereby minimizing the difference in the driving feeling by the driver.

Figure 12:
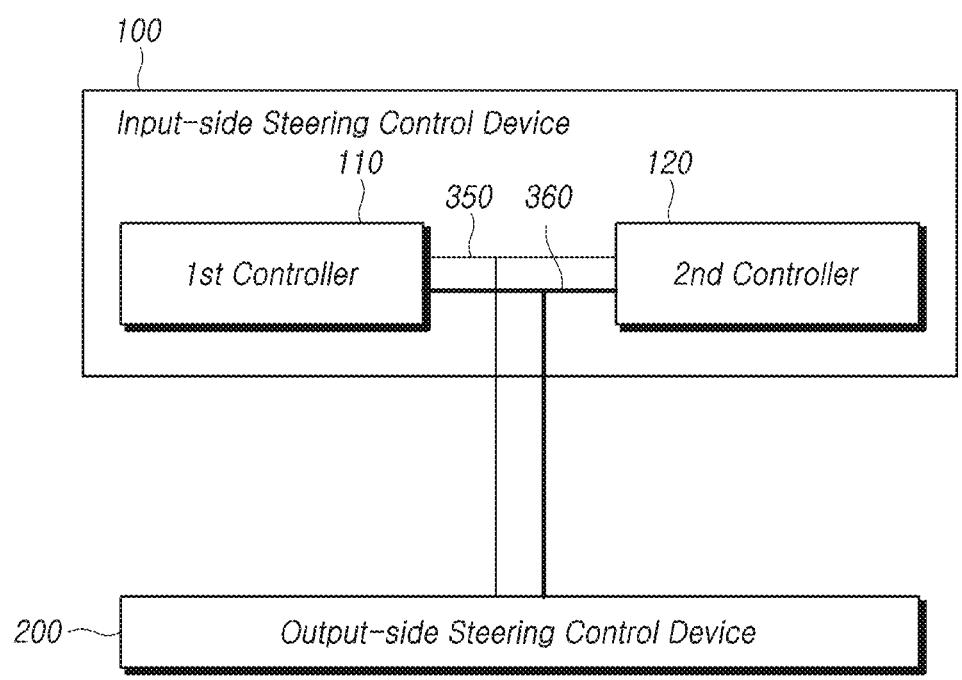
FIG. 12 is a block diagram illustrating a third embodiment of an input-side steering control device according to the present disclosure.
Figure 13:
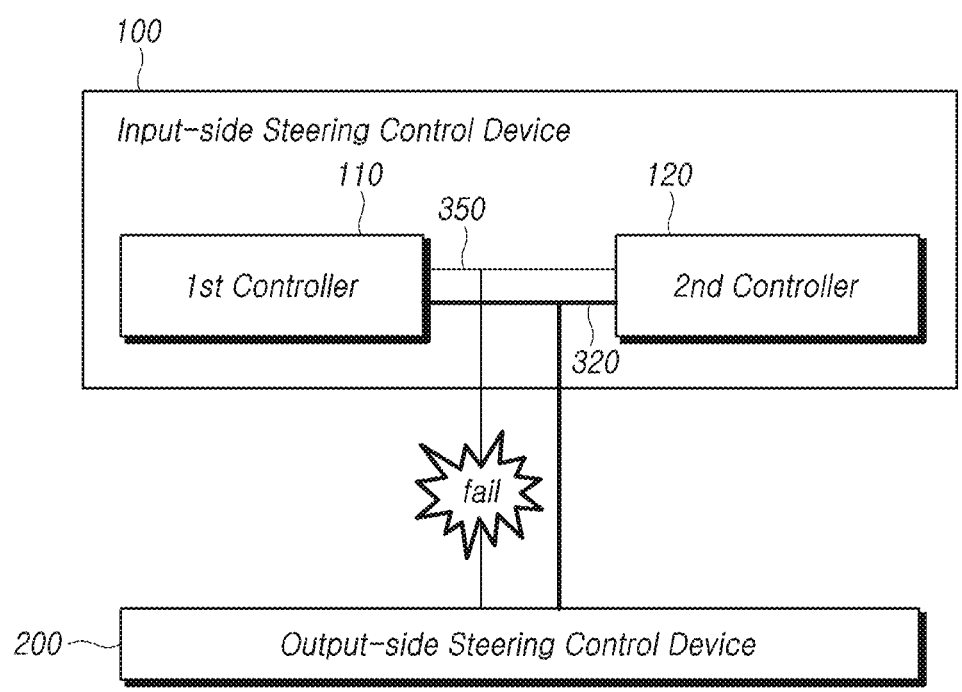
FIG. 13 is a block diagram illustrating an embodiment in which the input-side steering control device according to the third embodiment outputs a control signal.
Figure 14:
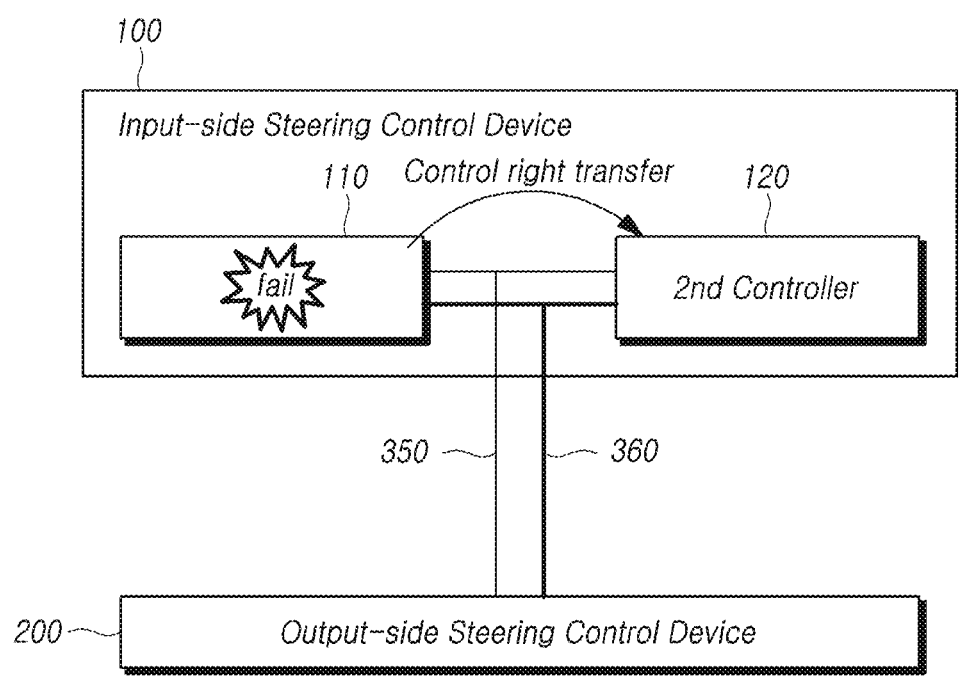
FIG. 14 is a block diagram for explaining an operation performed when the controller included in the steering control device according to the third embodiment fails.

FIG. 12 is a block diagram illustrating a third embodiment of a steering control device 15 according to the present disclosure, FIG. 13 is a block diagram illustrating an embodiment in which the input-side steering control device 100 according to the third embodiment outputs a control signal, and FIG. 14 is a block diagram for explaining an operation performed when the controller included in the steering control device 15 according to the third embodiment fails.

Referring to FIG. 12, the steering control device 15 according to the present disclosure may include a plurality of controllers, as described above. For example, the steering control device 15 may include an input-side steering control device 100, and the input-side steering control device 100 may include a first controller 110 and a second controller 120.

As described above with reference to FIG. 4, the first controller 110 and the second controller 120 may control an output-side steering control device 200. That is, at least one of the first controller 110 and the second controller 120 may receive steering information of the steering wheel, calculate a steering control value, and generate a control signal indicative of the steering control value.

In this case, as described above, in the case that both the first controller 110 and the second controller 120 are the main controllers, the first controller 110 and the second controller 120 both may generate control signals. Alternatively, if any one of the first controller 110 and the second controller 120 is the main controller, only the main controller may generate a control signal, and when the main controller fails, the sub-controller may generate a control signal.

The first controller 110 may be connected to the output-side steering control device 200 and the second controller 120 through a fifth communication bus 350. Specifically, the first controller 110 and the second controller 120 may be connected to the fifth communication bus 350 extending in one direction, and the first controller 110 and the output-side steering control device 200 may be connected to a fifth communication bus 350 extending in the other direction.

The second controller 120 may be connected to the output-side steering control device 200 and the first controller 110 through a sixth communication bus 360. Specifically, the first controller 110 and the second controller 120 are connected to the sixth communication bus 360 extending in one direction, and the second controller 120 and the output-side steering control device 200 may be connected to the sixth communication bus 360 extending in the other direction.

Here, the fifth communication bus 350 and the sixth communication bus 360 may be used for communication with the same priority as described above, or the priority of each of the plurality of communication buses may be different from each other. For example, the fifth communication bus 350 is used as a main communication bus, and the sixth communication bus 360 is used as a sub communication bus. However, the present invention is not limited thereto.

Meanwhile, at least one of the first controller 110 and the second controller 120 may determine whether any one of the fifth communication bus 350 and the sixth communication bus 360 fails. For example, the first controller 110 determines whether the fifth communication bus 350 fails or determines whether the sixth communication bus 360 fails. However, the present invention is not limited thereto.

Here, at least one of the first controller 110 and the second controller 120 may output a control signal to the output-side steering control device 200 through the communication bus in a normal state based on the determination result.

Referring to FIG. 13, for example, the first controller 110 determines whether the fifth communication bus 350 fails. If the fifth communication bus 350 fails, the first controller 110 outputs a control signal to the output-side steering control device 200 through the sixth communication bus 360 in a normal state. However, the present invention is not limited thereto.

Meanwhile, in the case that any one of the fifth communication bus 350 and the sixth communication bus 360 is the main communication bus and the other is the sub communication bus, at least one of the first controller 110 and the second controller 120 may output a control signal to the output-side steering control device 200 through the main communication bus, and if the main communication bus fails, may output a control signal to the output-side steering control device 200 through a sub communication bus.

For example, in the case that the fifth communication bus 350 is a main communication bus preferentially used over the sixth communication bus 360, the first controller 110 may determine whether the first communication bus 310 fails, may outputs, if the fifth communication bus 350 fails, a control signal to the output-side steering control device 200 through the sixth communication bus 360, or may output, if the fifth communication bus 350 does not fail, the control signal to the output-side steering control device 200 through the fifth communication bus 350. However, the present invention is not limited thereto.

Although not shown, the above-described example may be similarly applied to the second controller 120, and the steering control device 15 according to the third embodiment may perform the same functions as the steering control device according to each of the first and second embodiments except for the above-described functions.

Meanwhile, as described above with reference to FIG. 9, the controller included in the steering control device 15 according to the third embodiment may monitor its own state. In addition, if the controller operating as the main controller is in a failed or abnormal state, the control right for the output-side steering control device 200 included in the main controller may be transferred to the sub-controller.

Referring to FIG. 14, for example, the first controller 110 operating as the main controller determines whether the first controller 110 fails, and transfers the control right to the output-side steering control device 200 to the second controller 120 based on the determination result. Also, the second controller 120 performs an operation of controlling the output-side steering control device 200 when the control right is transferred.

Specifically, if the first controller 110 is in a normal state and the fifth communication bus 350 fails, the first controller 110 outputs a control signal to the output-side steering control device 200 through the sixth communication bus 360. Meanwhile, if the first controller 110 fails, the first controller 110 transfers the control right to the second controller 120. However, the present invention is not limited thereto.

As described above, the steering control device 15 according to the third embodiment provides the effect of arranging a communication bus efficiently and achieving a high degree of integration, thereby reducing the weight of the vehicle and reducing the manufacturing cost.

Figure 15:
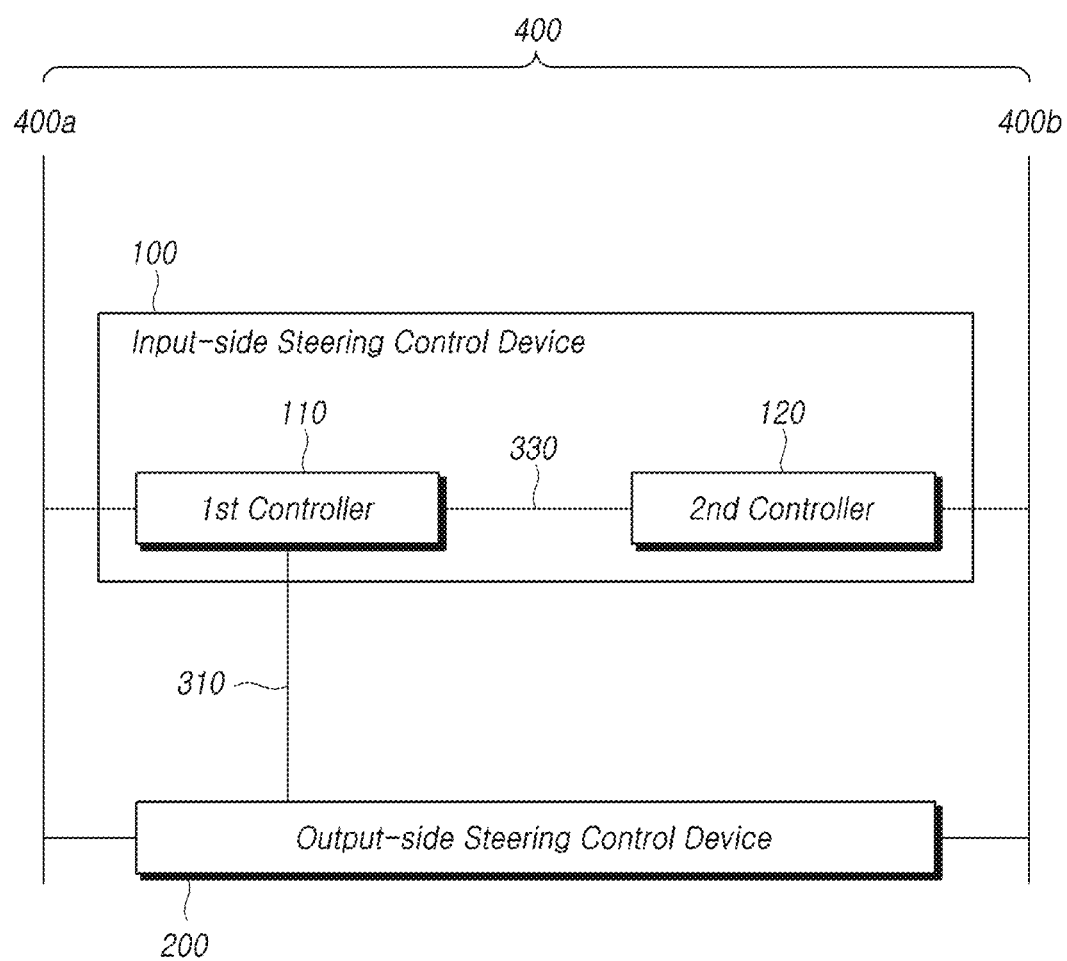
FIG. 15 is a block diagram illustrating a fourth embodiment of a steering control device according to the present disclosure.
Figure 16:
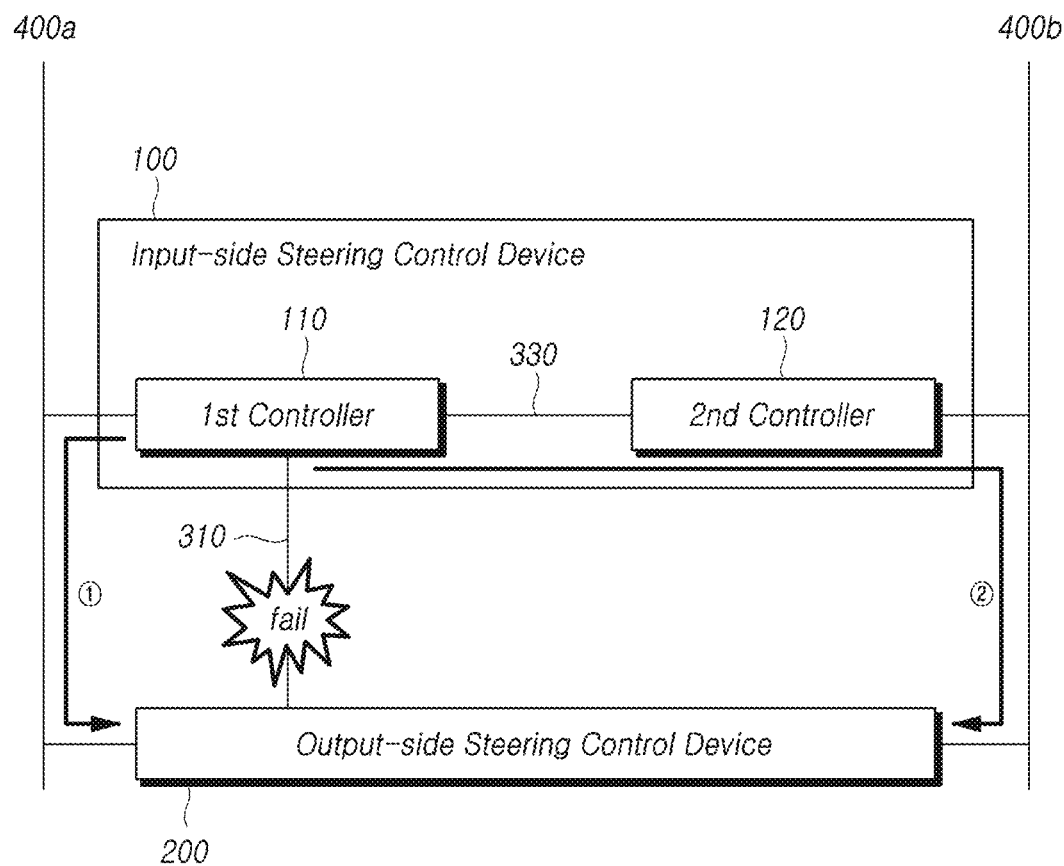
FIG. 16 is a block diagram illustrating an embodiment in which the input-side steering control device according to the fourth embodiment outputs a control signal.
Figure 17:
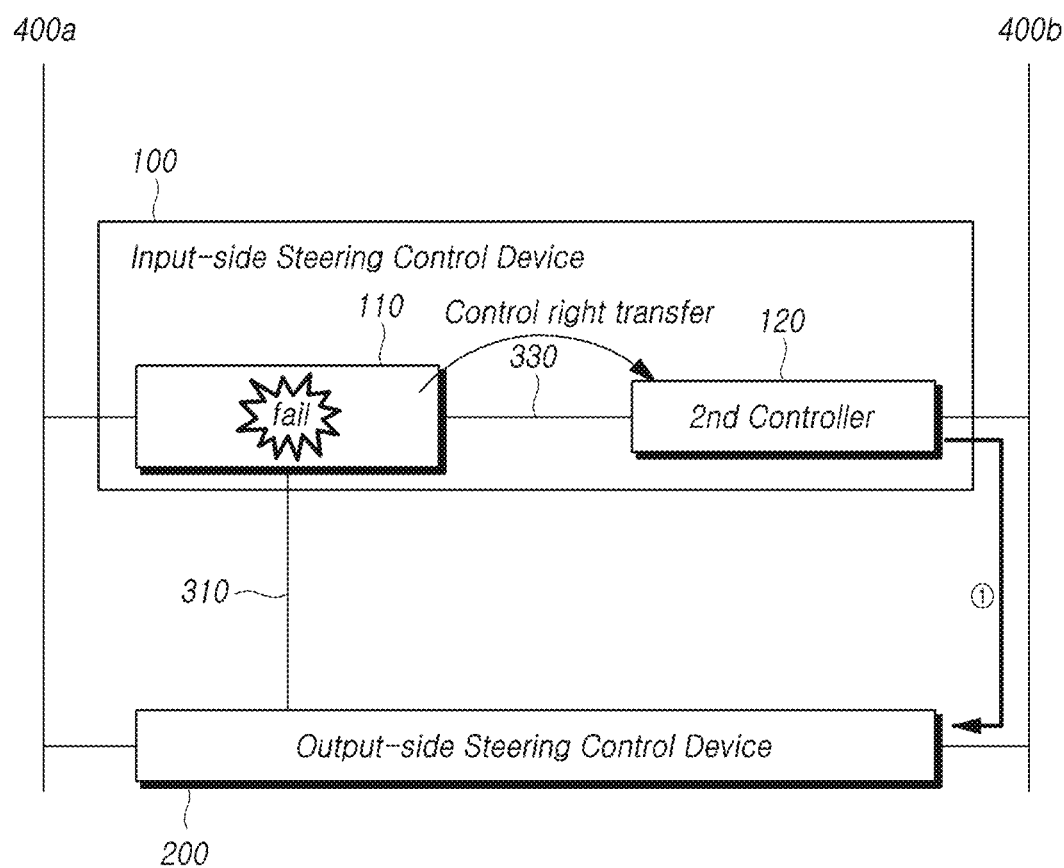
FIG. 17 is a block diagram for explaining an operation performed when the controller included in the steering control device according to the fourth embodiment fails.

FIG. 15 is a block diagram illustrating a fourth embodiment of a steering control device 15 according to the present disclosure, FIG. 16 is a block diagram illustrating an embodiment in which the input-side steering control device 100 according to the fourth embodiment outputs a control signal, and FIG. 17 is a block diagram for explaining an operation performed when the controller included in the steering control device 15 according to the fourth embodiment fails.

Referring to FIG. 15, an input-side steering control device 100 according to the fourth embodiment may output a control signal to the output-side steering control device 200 using a public communication bus described above with reference to FIG. 3.

Specifically, the steering assistance system 1 may include a steering control device 15 including an input-side steering control device 100 and an output-side steering control device 100, and at least one public communication bus 400a, 400b connecting the input-side steering control device 100 and the output-side steering control device 200.

Here, the steering control device 100 may include, for example, a first controller 110 connected to the output-side steering control device 200 through a first communication bus 310, and a second controller 120 connected to the first controller 110 through a third communication bus 330.

In this case, the first controller 110 may operate as a main controller, and the second controller 120 may operate as a sub-controller. However, the present invention is not limited thereto, and if the first communication bus 310 is connected to the second controller 120 and the output-side steering control device 200, the second controller 120 may operate as a main controller.

Here, the first communication bus 310 may be the same as described above with reference to FIGS. 3 to 10, and the third communication bus 330 may be the same as described above with reference to FIGS. 3 to 10. However, the present invention is not limited thereto.

Meanwhile, in the case that the first controller 110 is the main controller, the first controller 110 may receive steering information of the steering wheel, calculate the steering control value to generate a control signal indicating the steering control value, determine whether the first communication bus 310 fails, and output a control signal to the output-side steering control device 200 through at least one of the first communication bus 310 and the public communication bus in a normal state based on the determination result.

For example, if the first communication bus 310 fails, the first controller 110 outputs a control signal to the output-side steering control device 200 through the public communication bus. If the first communication bus 310 is in a normal state, the first controller 110 outputs a control signal to the output-side steering control device 200 through the first communication bus 310.

Here, in the case that there are a plurality of public communication buses, there may also be a plurality of paths through which the control signal is transmitted to the output-side steering control device 200 through the public communication bus.

Referring to FIG. 16, for example, the public communication bus includes a first public communication bus 400a connected to the first controller 110 and a second public communication bus 400b connected to the second controller 120. If the first communication bus 310 fails, the first controller 110 outputs a control signal to the output-side steering control device 200 through at least one of the first public communication bus 400a and the second public communication bus 400b.

Specifically, if the first communication bus 310 fails, the control signal generated by the first controller 110 may be transmitted to output-side steering control device 200 through the communication path ① according to the first public communication bus 400a, or may be transmitted to the output-side steering control device 200 through the communication path ② according to the third communication bus 330 and the second public communication bus 400b.

Meanwhile, as described above with reference to FIG. 9, the controller included in the steering control device 15 according to the fourth embodiment may monitor its own state, and in the case that the controller operating as the main controller is in an abnormal state, the control right of the main controller may be transferred.

Referring to FIG. 17, for example, the first controller 110 operating as a main controller determines whether the first controller 110 fails, and transfers the control right for the output-side steering control device 200 to the second controller 120 based on the determination result. Also, the second controller 120 controls the output-side steering control device 200 when the control right is transferred.

Specifically with reference to FIG. 17, for example, if the first controller 110 is in a normal state and the first communication bus 310 fails, the first controller 110 outputs a control signal to the output-side steering control device 200 through the public communication bus, and if the first controller 110 fails, the first controller transfers the control right to the second controller 120.

In this case, if the control right is transferred, the second controller 120 may output a control signal to the output-side steering control device 200 through the public communication bus.

Referring to FIG. 17, for example, the second controller 120 having the control right outputs a control signal to the output-side steering control device 200 through the communication path ① according to the second public communication bus 400b. However, the present invention is not limited thereto, and the second controller 120 having the control right may output a control signal to the output-side steering control device 200 through a communication path according to the first public communication bus 400a.

As described above, the steering control device 15 according to the fourth embodiment may provide the effect of providing driving stability and reducing cost of transceiver and harness of communication bus by implementing fail safety based on redundancy while minimizing the arrangement of communication bus.

Figure 18:
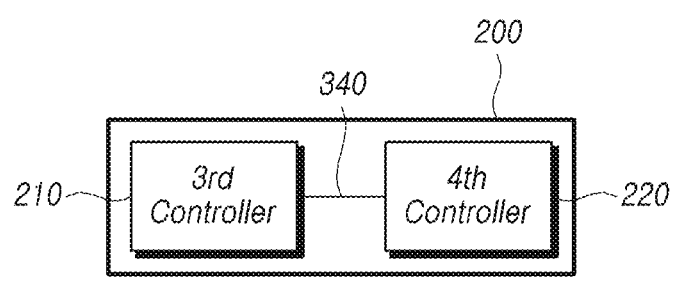
FIG. 18 is a block diagram for explaining an output-side steering control device.

FIG. 18 is a block diagram for explaining an output-side steering control device.

Referring to FIG. 18, the output-side steering control device 200 may include a third controller 210 and a fourth controller 220. The output-side steering control device 200 may include a controller capable of receiving a control signal from the input-side steering control device 200 and outputting it to the steering motor 21. In addition, the output-side steering control device 200 may receive the sensor information detected by the rack position sensor 24 of the output-side actuator 20, the steering angle sensor (not shown), the yaw rate sensor (not shown), and may generate a feedback signal for the control signal and output the feedback signal to the input-side steering control device 100.

In addition, a plurality of such controllers may be configured to implement a redundant system. The third controller 210 may be connected to the fourth controller 220 through a fourth communication bus 340. In addition, the third controller 210 and the fourth controller 220 may be connected to the first controller 110 in various forms according to the above-described embodiments.

In the case as the embodiment of FIGS. 4 and 5, the third controller 210 is connected to the first controller 110 through the first communication bus 310, and the fourth controller 220 is connected to the second controller 120 through the second communication bus 320.

In the case as the embodiment of FIGS. 6 and 7, the third controller 210 may be connected to the first controller 110 through a plurality of first communication buses 310a and 310b, and the fourth controller 220 may be connected to the second controller 120 through the second communication bus 320.

In the case as the embodiment of FIG. 8, the third controller 210 may be connected to the first controller 110 through the first main communication bus 311 and the first sub communication bus 312, the fourth controller 220 may be connected to the second controller 120 through a second main communication bus (not shown) and a second sub communication bus (not shown).

In case of FIGS. 4 to 8, if the control signal cannot be directly output from the first controller 110 to the third controller 210, the control signal may be output to the third controller 210 through the communication path ② via the second controller 120. In this case, the communication path may be formed by a third communication bus 330 connecting the first controller 110 and the second controller 120, a second communication bus connecting the second controller 120 and the fourth controller, and a fourth communication bus 340 connecting the fourth controller 220 and the third controller 210.

In the case as the embodiment of FIG. 9, the third controller 210 may be connected to the first controller 110 through the first communication bus 310, and the fourth controller 220 may be connected to the second controller 120 through the second communication bus 320. As shown in FIG. 9, if the first controller 110 fails, the second controller 120 having the control right of the output-side steering control device may output a control signal to the third controller 210 through the second communication bus 320 and the fourth communication bus 340.

Similarly, if the first controller 110 is in a normal state and the third controller 210 as a main controller of the output-side steering control device fails, the control right of the output-side actuator may be transferred to the fourth controller as a sub-controller. In this case, the first controller 110 may output a control signal to the fourth controller 220 through the third communication bus 330 and the second communication bus 320.

In the case as the embodiment of FIG. 10, each of the first communication bus 310 to which the third controller 210 and the first controller 110 are connected, a second communication bus 320 to which the fourth controller 220 and the second controller 120 are connected, a third communication bus 330, and the fourth communication bus 340 to which the third controller 210 and the fourth controller 220 are connected may be configured in plurality, and each communication bus may be used for internal communication with the same priority or may be used for internal communication with different priorities. Here, each of the plurality of controllers may determine whether the connected communication bus fails.

Accordingly, in the case of the embodiment of FIG. 11, if any one 310a of the plurality of first communication buses 310a and 310b fails, the first controller 110 may transmit a control signal to the third controller 210 through the first communication bus 310b in a normal state (① in FIG. 11). In addition, if any one 320a of the plurality of second communication buses 320a and 320b fails, the second controller 120 may transmit a control signal to the fourth controller 220 through the second communication bus 320b in a normal state a in FIG. 11).

In the case of the embodiment of FIGS. 12 to 14, the first controller 110 may be connected to the second controller 120, the third controller 210, and the fourth controller 220 through the fifth communication bus 350. Also, the first controller 110 may be connected to the second controller 120, the third controller 210 and the fourth controller 220 through the sixth communication bus 360.

Accordingly, the first controller 110 or the second controller 120 may output a control signal to the third controller 210 or the fourth controller 220 through the fifth communication path 350, or may output a control signal to the third controller 210 or the fourth controller 220 through the sixth communication path 360, depending on the situation.

In the case of the embodiment of FIGS. 15 to 17, the third controller 210 may be connected to the first controller 110 through the first public communication bus 400a and the first communication bus 310. In addition, the fourth controller 220 may be connected to the third controller 210 through the fourth communication bus 340, and may be connected to the second controller 120 through the second public communication bus 400b.

Accordingly, if the first communication path 310 fails, the first controller 110 may output a control signal to the third controller 210 through a path (① in FIG. 15) via the first public communication bus 400a and a path (② in FIG. 15) via the third communication bus 330, the second public communication bus 400b and the fourth communication bus 340.

In addition, if the first controller 110 fails, the control right of the output-side steering control device 200 is transferred to the second controller 120, and the second controller 120 may output a control signal to the third controller 210 through the second public communication bus 400b and the fourth communication bus 340.

Figure 19:
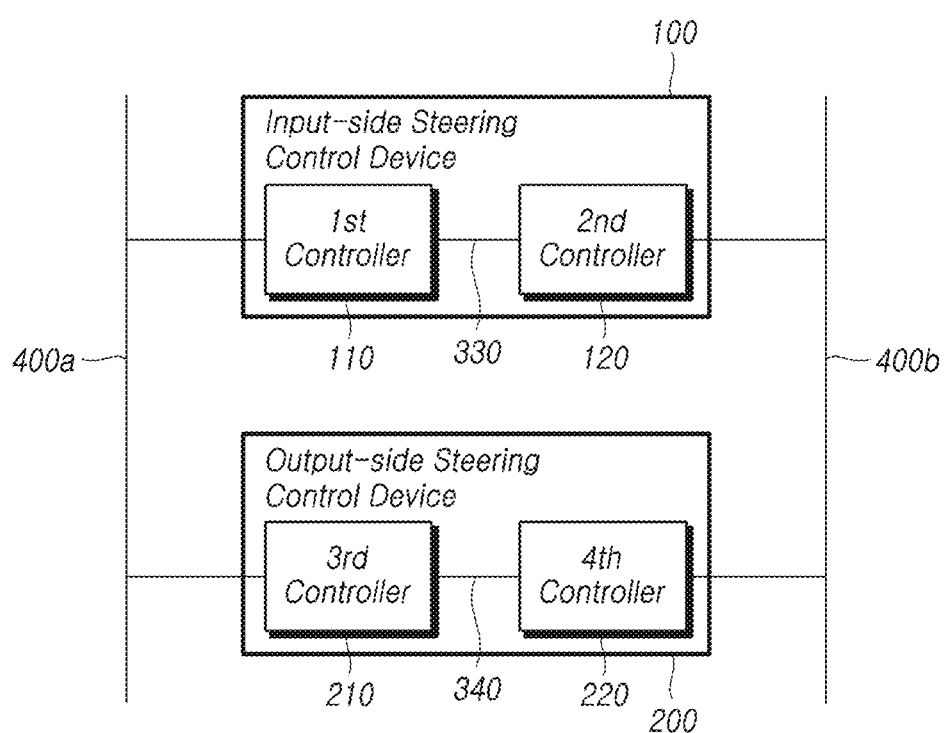
FIG. 19 is a block diagram illustrating a fifth embodiment of a steering control device according to the present disclosure.

FIG. 19 is a block diagram illustrating a fifth embodiment of a steering control device according to the present disclosure.

Referring to FIG. 19, an input-side steering control device 100 according to the fifth embodiment may output a control signal to the output-side steering control device 200 using the public communication bus 400.

Specifically, the steering assistance system 1 may include an input-side actuator 10, an output-side actuator 20 mechanically separated from the input-side actuator 10, an input-side steering control device 100 for controlling the input-side actuator 10, an output-side steering control device 200 for controlling the output-side actuator 20, and at least one public communication bus 400 connecting the input-side actuator 10, the output-side actuator 20 and a steering control device 15.

Specifically, the input-side steering control device 100 may include a first controller 110 which is connected to the output-side steering control device 200 through the public communication bus 400 and connected to the second controller 120 through the third communication bus 330, and a second controller 120 which is connected to the first controller 110 through the third communication bus 330 and connected to the output-side steering control device 200 through the public communication bus 400.

In addition, the output-side steering control device 200 may include a third controller 210 which is connected to the first controller 110 through the public communication bus 400 and connected to the fourth controller 220 through the fourth communication bus 340, and a fourth controller 220 which is connected to the second controller 120 through the public communication bus 400 and is connected to the third controller 210 through the fourth communication bus 340.

More specifically, the third controller 210 may be connected to the first controller 110 through a first public communication bus 400$a$, and the fourth controller 220 may be connected to the second controller 120 through the second public communication bus 400$b$.

In addition, each controller may determine whether a communication bus connected to the respective controller fails, and a communication path may be set according to the determination result.

For example, if the first public communication bus 400$a$ fails, the first controller 110 may output a control signal to the third controller 210 through the third communication bus 330, the second public communication bus 400$b$, and the fourth communication bus 340.

Meanwhile, as shown in FIG. 8, the input-side steering control device 100 and the output-side steering control device 200 may perform fail safe function based on the redundant system. For example, in the case that the first controller 110 is a main controller and the first controller 110 fails, the control right of the output-side steering control device 200 is transferred to the second controller 120, and the second controller 120 may output a control signal to the third controller 210 through the second public communication bus 400$b$ and the fourth communication bus 340.

In addition, the controllers based on the redundant system (e.g., the first controller and the second controller) may output a status check signal for determining the status of each other. Such a status check signal may be output at a preset period, a preset feedback signal can be received from a controller in response to the outputted status check signal. If the preset feedback signal is modified or not received in a preset period, the controller outputting the status check signal may determine the state of the counterpart controller as a fail state.

Further, in the environment as shown in FIG. 19, the first controller 110 may output a status check signal to the second controller 120 through the third communication bus 330 to determine the state of the second controller 120. In this case, if the third communication bus 330 fails, the first controller 110 may output a status check signal to the second controller 120 through the first public communication bus 400$a$, the fourth communication bus 340, and the second public communication bus 400$b$.

The status check of the controller may be applied to the third controller 210 and the fourth controller 220 included in the same redundant system. Accordingly, if the fourth communication bus 340 fails, the third controller 210 may output a status check signal to the fourth controller 220 through the first public communication bus 400$a$, the third communication bus 330, and the second public communication bus 400$b$.

As described above, the steering assistance system 1 may transmit and receive data without a dedicated communication bus connected between the input-side steering control device 100 and the output-side steering control device 200. Further, even if a specific public communication bus fails, a control signal can be output by passing through the public communication bus connected to another controller.

As described above, according to the present disclosure, it is possible to provide a steering control device and a steering assistance system capable of performing stable control without temporary performance degradation by continuously controlling an output-side steering control device 200 through another communication path even if a communication bus fail.

In addition, according to the present disclosure, it is possible to provide a steering control device and a steering assistance system capable of minimizing the difference in driving feeling by a driver by continuously providing steering assistance power without an interruption of control even if a communication bus fails.

In addition, according to the present disclosure, it is possible to provide a steering control device and a steering assistance system capable of reducing the weight of the vehicle and reducing the manufacturing cost by efficiently deploying the communication bus and achieving a high degree of integration.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

CROSS-REFERENCE TO RELATED APPLICATIONS

This patent application is the national stage of International Patent Application No. PCT/KR2020/007545 filed on Jun. 11, 2020, which claims priority in accordance with Article 119(a) of the U.S. Patent Law (35 USC § 119(a)) for Patent Application No. 10-2019-0073259 filed in Korea on Jun. 20, 2019, which all contents are incorporated into this patent application by reference. In addition, if this patent application claims priority for countries other than the United States for the same reason as above, all the contents are incorporated into this patent application as references.

The invention claimed is:

1. A steering control device for controlling an output-side actuator mechanically separated from an input-side actuator comprising:
   a first controller connected to an output-side steering control device through at least one first communication bus; and
   an input-side steering control device comprising a second controller connected to the output-side steering control device through at least one second communication bus and connected to the first controller through at least one third communication bus, wherein at least one of the first controller and the second controller is configured to, determine whether at least one communication bus connected to the output-side steering control device fails, output a control signal to the output-side steering control device through a communication bus in a normal state based on a determination result, and output, if the at least one first communication bus fails, the control signal to the output-side steering control device through a communication path according to the third communication bus and the second communication bus.

2. The steering control device of claim 1, wherein the first communication bus is one, and the first controller outputs, if the one first communication bus fails, the control signal to the output-side steering control device through the communication path according to the third communication bus and the second communication bus.

3. The steering control device of claim 1, wherein the first communication bus is plural, and the first controller outputs, if a failure of a first communication bus among the plurality of first communication buses exists, the control signal to the output-side steering control device through a first communication bus in a normal state.

4. The steering control device of claim 3, wherein the first controller outputs, if all of the plurality of first communication buses fail, the control signal to the output-side steering control device through the communication path according to the third communication bus and the second communication bus.

5. The steering control device of claim 1, wherein the first communication bus comprises a first main communication bus preferentially used and a first sub communication bus used when the first main communication bus fails, and the first controller outputs the control signal to the output-side steering control device through the first sub communication bus 312 if the first main communication bus fails, and outputs the control signal to the output-side steering control device through the first main communication bus if the first main communication bus is in a normal state.

6. The steering control device of claim 5, wherein the first controller outputs, if the first main communication bus and the first sub communication bus fail, the control signal to the output-side steering control device through the communication path according to the third communication bus and the second communication bus.

7. The steering control device of claim 1, wherein the first controller determines whether the first controller fails, and transfers a control right to the output-side steering control device to the second controller based on a determination result, and the second controller performs an operation of controlling the output-side steering control device when the control right is transferred.

8. The steering control device of claim 7, wherein the first controller outputs the control signal to the output-side steering control device through the third communication bus and the second communication bus if the first controller is in a normal state and the first communication bus fails, and transfers the control right to the second controller if the first controller fails.

9. The steering control device of claim 1, further comprising the output-side steering control device which controls the output-side actuator and comprises a third controller and a fourth controller, wherein the third controller is connected to the first controller through the at least one first communication bus, and the fourth controller is connected to the second controller through the at least one second communication bus, and is connected to the third controller through at least one fourth communication bus.

10. A steering control device for controlling an output-side actuator mechanically separated from an input-side actuator comprising:

a first controller connected to an output-side steering control device and a second controller through a first communication bus; and an input-side steering control device comprising the second controller connected to the output-side steering control device and the first controller through a second communication bus, wherein at least one of the first controller and the second controller is configured to, determine whether any one of the first communication bus and the second communication bus fails, and output a control signal to the output-side steering control device through a communication bus in a normal state based on a determination result.

11. The steering control device of claim 10, wherein the first communication bus is a main communication bus preferentially used over the second communication bus, and the first controller is configured to, determine whether the first communication bus fails, and if the first communication bus fails, outputs the control signal to the output-side steering control device through the second communication bus, and outputs, if the first communication bus does not fail, the control signal to the output-side steering control device through the first communication bus.

12. The steering control device of claim 10, wherein the first controller determines whether the first controller fails, and transfers a control right to the output-side steering control device to the second controller based on a determination result, and the second controller performs an operation of controlling the output-side steering control device when the control right is transferred.

13. The steering control device of claim 10, further comprising the output-side steering control device which controls the output-side actuator and comprises a third controller and a fourth controller, wherein the third controller is connected to the first controller, the second controller and the fourth controller through the first communication bus, and the fourth controller is connected to the first controller, the second controller and the third controller through the second communication bus.

14. A steering assistance system comprising:

an input-side steering control device for controlling an input-side actuator;

an output-side steering control device for controlling an output-side actuator; and at least one public communication bus for connecting the input-side actuator, the output-side actuator, the input-side steering control device and the output-side steering control device, wherein the input-side steering control device comprises, a first controller connected to the output-side steering control device through the public communication bus and connected to a second controller through a first communication bus, and a second controller connected to the first controller through the first communication bus and connected to the output-side steering control device through the public communication bus.

15. The steering assistance system of claim 14, wherein the first controller is connected to the output-side steering control device through a third communication bus, and the first controller is configured to, determine whether the third communication bus fails, and output a control signal to the output-side steering control device through at least one of the third communication bus and the public communication bus in a normal state based on a determination result, and output the control signal to the output-side steering control device through the public communication bus if the third communication bus fails, and output the control signal to the output-side steering control device through the third communication bus if the third communication bus is in the normal state.

16. The steering assistance system of claim 15, wherein the public communication bus comprises a first public communication bus connected to the first controller and a second public communication bus connected to the second controller, and the first controller outputs the control signal to the output-side steering control device through at least one of the first public communication bus and the second public communication bus if the first communication bus fails.

17. The steering assistance system of claim 15, wherein the first controller determines whether the first controller fails, and transfers a control right to the output-side steering control device to the second controller based on a determination result, and the second controller performs an operation of controlling the output-side steering control device when the control right is transferred.

18. The steering assistance system of claim 17, wherein the first controller outputs the control signal to the output-side steering device through the public communication bus if the first controller is in a normal state and the first communication bus fails, and transfers the control right to the second controller if the first controller fails.

19. The steering assistance system of claim 14, wherein the output-side steering control device comprises:

a third controller connected to the first controller through the public communication bus and connected to a fourth controller through the second communication bus; and the fourth controller connected to the second controller through the public communication bus and connected to the third controller through the second communication bus.

20. The steering assistance system of claim 19, wherein the public communication bus comprises a first public communication bus connected to the first controller and the third controller, and a second public communication bus connected to the second controller and the fourth controller, wherein the first controller outputs a status check signal to the second controller to determine whether the second controller fails, and outputs, if the first communication bus fails, the status check signal to the second controller through the first public communication bus.

* * * * *